(12) United States Patent
Wild

(10) Patent No.: US 9,839,195 B2
(45) Date of Patent: Dec. 12, 2017

(54) SPILL-PREVENTIVE PET TRAINING APPARATUS AND METHOD

(71) Applicant: James Wild, Springfield, LA (US)

(72) Inventor: James Wild, Springfield, LA (US)

( * ) Notice: Subject to any disclaimer, the term of this patent is extended or adjusted under 35 U.S.C. 154(b) by 198 days.

(21) Appl. No.: 14/990,166

(22) Filed: Jan. 7, 2016

(65) Prior Publication Data

US 2017/0196194 A1 Jul. 13, 2017

(51) Int. Cl.
*A01K 29/00* (2006.01)
*A01K 1/015* (2006.01)
*A01K 1/01* (2006.01)

(52) U.S. Cl.
CPC .......... *A01K 1/0157* (2013.01); *A01K 1/0107* (2013.01)

(58) Field of Classification Search
CPC .... A01K 1/0157; A01K 1/0107; A01K 1/011; A01K 1/0152
See application file for complete search history.

(56) References Cited

U.S. PATENT DOCUMENTS

| 3,284,273 | A | 11/1966 | Prentice | |
|---|---|---|---|---|
| 3,358,647 | A | 12/1967 | Wilson | |
| 3,386,417 | A | 6/1968 | Machowski | |
| 3,416,495 | A | 12/1968 | Wilson | |
| 3,626,900 | A | 12/1971 | Failla | |
| 4,250,834 | A | 2/1981 | Cheselka | |
| 5,797,347 | A | 8/1998 | Ochi | |
| 8,113,146 | B2 * | 2/2012 | Askinasi | A01K 1/0107 119/165 |
| 8,133,146 | B2 * | 3/2012 | Radzevich | F16H 1/2836 475/226 |
| 2012/0234253 | A1 | 9/2012 | Malm et al. | |
| 2012/0312242 | A1 * | 12/2012 | Hillman | A01K 1/0107 119/169 |

* cited by examiner

*Primary Examiner* — Kristen C Hayes
(74) *Attorney, Agent, or Firm* — Keaty Law Firm, LLC

(57) ABSTRACT

A spill-preventive pet-training apparatus and method for use in containing the lateral flow of liquid, such as urine, being applied to an absorbent pad at a volume and rate exceeding the absorption rate of the pad, by containing much of the liquid within an inner flexible ridge, and by slowing and containing any liquid that overtops the inner flexible ridge within an outer flexible ridge.

24 Claims, 3 Drawing Sheets

SPILL-PREVENTIVE PET TRAINING APPARATUS AND METHOD

BACKGROUND OF THE INVENTION

This invention provides a spill-preventive pet-training apparatus and method for use with a pet animal, such as a dog, in order to contain the lateral flow of liquid, such as urine, being applied to an absorbent pad at a volume and rate exceeding the absorption rate of the pad.

Various absorbent materials available in sheet form are known and used to absorb liquids and to absorb urine in particular. For humans, diapers or pads of cloth, paper, or plastic are available.

In the course of living with some pets, including dogs, and especially very young untrained pets or very old incontinent pets, urination inside the human dwelling is an issue. Absorbent sheets or pads can be used, and many pets can be trained to seek such an absorbent pad for urination. But the available absorbent sheets or pads are prone to spillage because the urine is applied at a fast rate to a small area of the pad, the pad's rate of absorption is low, and the urine flows laterally, spilling off the pad.

Although this issue applies very clearly to dogs, even some cats are known to have proclivities to urinate outside of a litter box, especially when old or sick, and other, less traditional pets can also present the issue.

Several patents and publications discuss the use of a leak-proof puppy training pad with various layers of absorbable material, which differ in the overall construction of the pet pans, including whether the pans or pads can be made flexible and disposable, as in the present invention.

U.S. Patent Application Publication No. 2012/0234253, published Sept. 20, 2012 to Michele Malm et al. for a "Portable Pet Toilet," discloses a portable pet toilet comprising three layers: a surface layer designed such that a pet is encouraged to urinate upon it; a bottom layer (shield layer) designed to prevent urine from contaminating any floor material upon which it rests; and an intermediate layer designed to absorb and retain the amount of urine that can be expected to be excreted by the pet. The bottom layer is afforded with a means for securing the position of the other two layers while allowing all three layers to be formed into a compact roll to facilitate portability.

U.S. Pat. No. 5,797,347, issued on Aug. 25, 1998 to Kengo Ochi for an "Absorbent Panel for Pet Animals," discloses an absorbent panel for pet animals such as dogs and cats, comprising a liquid-permeable topsheet, a liquid-impermeable backsheet, and a liquid-absorbent core panel therebetween. The core panel in turn comprises a relatively thin central region and a relatively thick side region.

U.S. Pat. No. 3,416,495, issued Dec. 17, 1968 to Henry Allen Wilson for a "Pet Pan with Disposable Lining," covers a pet commode and is an improvement in which a pan is provided that is impervious to liquid. The pan may be lined with paper, and is provided with means for holding the paper in position so that the animal may not remove it.

U.S. Pat. No. 3,284,273 issued Nov. 8, 1966 to E. E Prentice and covers an "Absorbent Pad." The invention relates to an absorbent pad and is particularly concerned with absorption or taking up of liquids into said pad to be retained and stored therein, a general object of the invention being to provide an article of manufacture that is particularly suited for use as a floor covering or the like and adapted to receive and store liquids contacting the same, while affording protection to the underlying floor. By "floor," the invention means to cover broadly any supporting surface, whether it be that of a building structure, vehicular body or container, etc.

U.S. Pat. No. 4,250,834 issued Feb. 17, 1981 to Stephen Cheselka for a "Pet Sanitary Facility." The invention covers a pet sanitary facility having a stack of a plurality of liquid impervious layers and a plurality of liquid absorbent layers, interleaved with each other, located below a perforated platform member made of non-liquid absorbent material. The peripheral portions of the stack may have support means surrounding same to raise the peripheral portions thereof. Spacer and support means are provided between the platform member and the stack.

U.S. Pat. No. 3,626,900, issued Dec. 14, 1971 to Fred Failla for a "Disposable Dog Commode," discloses an inexpensive disposable dog commode comprising a preferably square, flexible sheet of moistureproof material adapted to be spread upon a flat-supporting surface such as a floor, pavement, or the like. The sheet is to be held in such position while the dog uses same, followed by the contraction of the edges and corners of the sheet to enclose the excrement for disposal in a suitable waste receptacle.

U.S. Pat. No. 3,386,417, issued Jun. 4, 1968 to E. C. Machowski for a "Sanitary Station for Pet Animals," discloses a sanitary enclosure, and more particularly a sanitary station for pet animals, which is liquid-proof and affords additional protection for the floor, rugs, furniture, etc. The sanitary station comprises a rectangular plate-like station member, a means defining a rectangular enclosure within the main portion of said station member and spaced from the edge thereof, layers of liquid absorbing litter material within said enclosure, the edge portions of said station member assume inwardly inclining, angular configurations for directing the liquid from said edge portions into said enclosure, said enclosure being provided with a plurality of horizontally disposed holes adjacent the top surface of said station member for admitting said liquid therein, and leg members for supporting said edge portions and spacing them from the flat surface.

U.S. Pat. No. 3,358,647 issued Dec. 19, 1967 to H. A. Wilson for a "Pet Pan," and covers a pet commode or toilet pan, and more particularly covers a foldable and disposable receptacle for use in receiving an animal and its excretions. The animal toilet comprises a planar plural sided closed frame member and a liquid impervious bag loosely enclosing the frame, and provides a dished pan having sides formed by said frame and an intermediate double-thickness wall rested upon a supporting surface for the frame.

There exists a need for an absorbent pad that is capable of slowing and containing the lateral flow of liquid such as urine during the time required for the pad to absorb all of the liquid.

SUMMARY OF THE INVENTION

The present invention provides a spill-preventive pet-training apparatus and method for use in containing the lateral flow of liquid, such as urine, during the time required for the liquid to be absorbed into an absorbent pad, by containing much of the liquid within an inner flexible ridge, and by slowing and containing any liquid that overtops the inner flexible ridge within an outer flexible ridge.

The present invention solves existing problems of lateral flow and spillage of liquid such as urine being applied to absorbent pads at a volume and rate exceeding the absorption rate of the pad.

BRIEF DESCRIPTION OF DRAWINGS

Reference will now be made to the drawings, wherein like parts are designated by like numerals, and wherein.

DETAILED DESCRIPTION OF THE INVENTION

Figure 1:
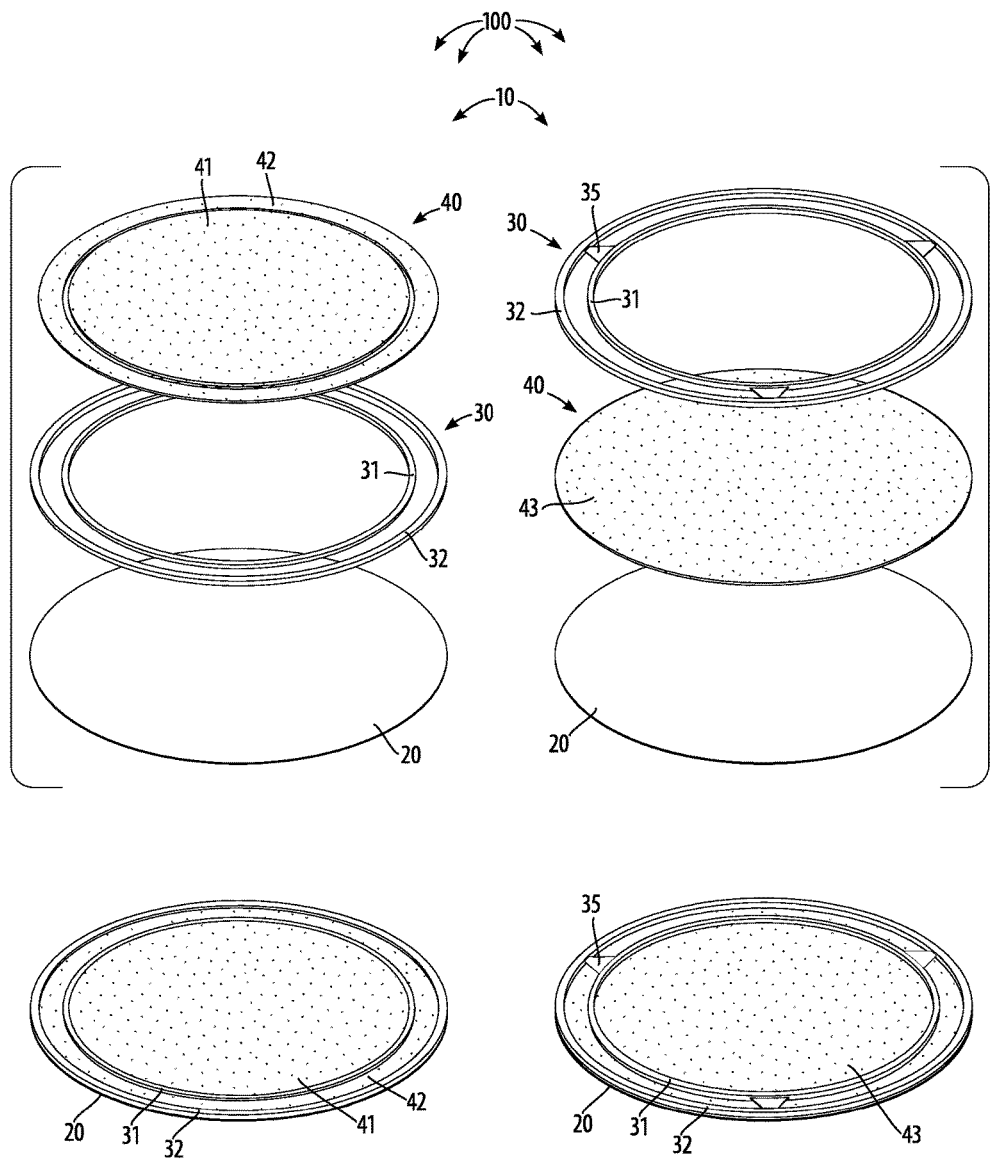
FIG. 1 is an exploded and assembled view of embodiments of the spill-preventive pet-training invention.

Referring to FIG. 1 and all figures generally, the spill-preventive pet-training method 100 and apparatus 10 are shown schematically.

The spill-preventive pet-training apparatus 10 is meant to be placed on a floor for the pet to urinate upon, or for similar uses.

Figure 2:
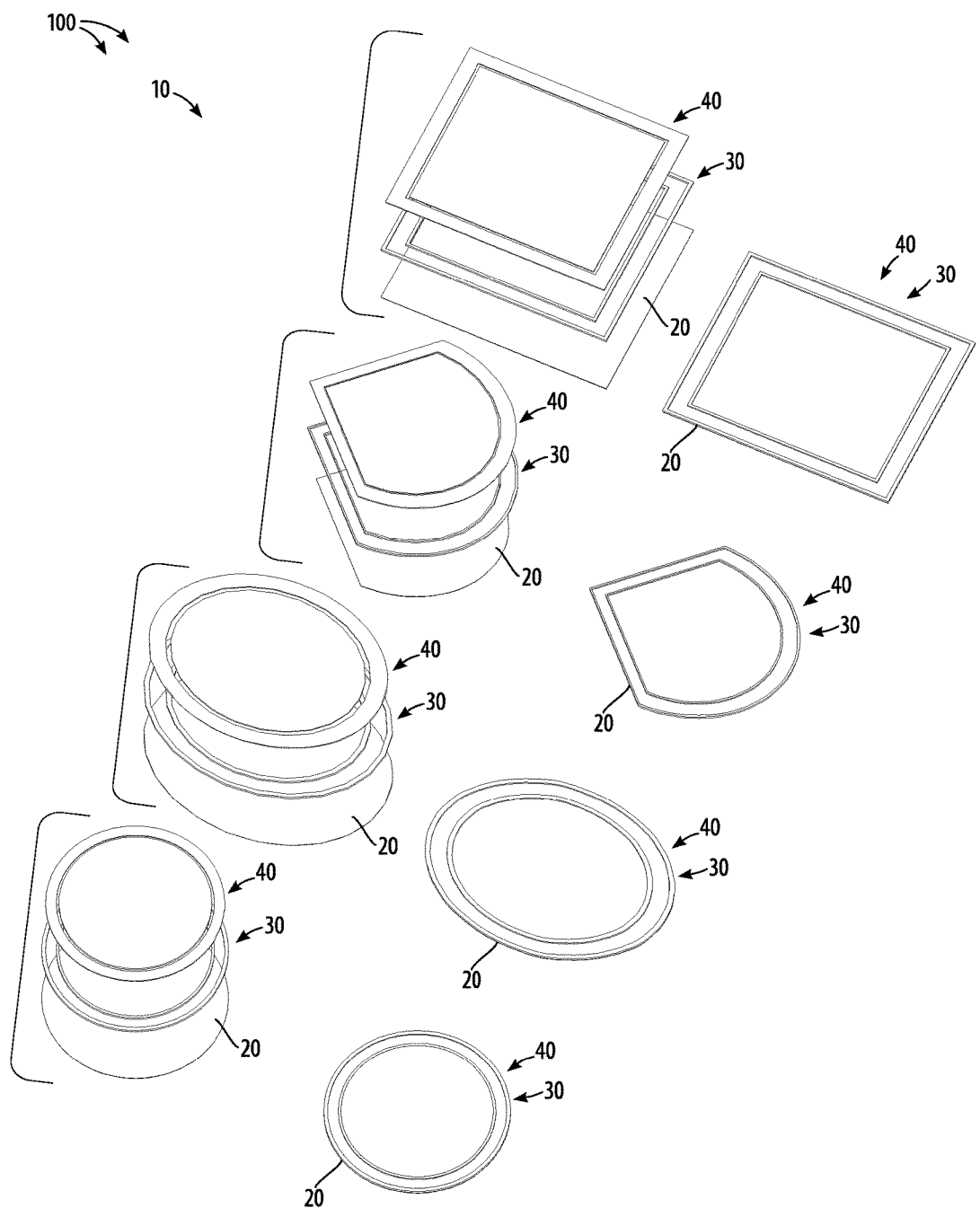
FIG. 2 is a schematic view of several shape embodiments of the spill-preventive pet-training invention.

The invention provides an impermeable base 20 which defines the horizontal coverage area of the invention. The impermeable base 20 can be made of plastic or rubber sheeting or similar materials, and can be made to be disposable or be durable and re-useable. Embodiments of the invention can be made with various-shaped impermeable bases 20, as illustrated in FIG. 2. The impermeable base 20 has a center portion and a perimeter portion, with the perimeter completely enclosing the center.

The invention also provides concentric raised flexible ridges 30 arrayed upon the top of the impermeable base 20. As illustrated in FIG. 1, the concentric raised flexible ridges can be placed directly on top of the base or can be placed such that an absorbent sheet, as disclosed below, can be placed in between. Two concentric raised flexible ridges 30, an inner ridge 31 and an outer ridge 32, are provided in a preferred embodiment. Additional ridges can also be provided, while still having an inner ridge and an outer ridge. The concentric raised flexible ridges 30, when arrayed upon the top of the impermeable base 20, will have a ridge height above the base.

The concentric raised flexible ridges 30 can be made of plastic or rubber or similar materials, as with the impermeable base 20. In some embodiments the concentric raised flexible ridges 30 can be incorporated into the impermeable base 20 either by attachment or by molding such ridges into the base during manufacture. In other embodiments, the concentric raised flexible ridges 30 can be provided with ridge spacers 35, keeping the inner and outer ridges in proper relation to each other.

The invention also provides an absorbent layer 40 arrayed upon the impermeable base 20 and under or between the ridges. The thickness of the absorbent layer material and the method of mounting it will determine a height relative to the impermeable base 20 of the top of the absorbent layer. In the center portion, inside the inner ridge 31, the height of the installed absorbent layer should be lower than the ridge height of the inner ridge 31. In other words, the top of the inner ridge 31 should be higher than the top of the installed absorbent layer 40.

The absorbent layer 40 can be made from a variety of materials, depending in part on whether a disposable or a re-useable unit is intended. The sheets of the absorbent layer 40 can be made of, for example, woven cloth of cotton or other natural fiber, of paper, or of woven, extruded, expanded, or otherwise made absorbent plastics. In embodiments having the absorbent layer 40 between the base and the ridges, a unitary absorbent sheet 43 is appropriate. In embodiments having the ridges mounted directly to the base, an inner absorbent sheet 41 and an outer absorbent sheet 42, fitting to the exposed surface of the impermeable base 20 and leaving the concentric raised flexible ridges 30 uncovered, is appropriate.

Figure 3:
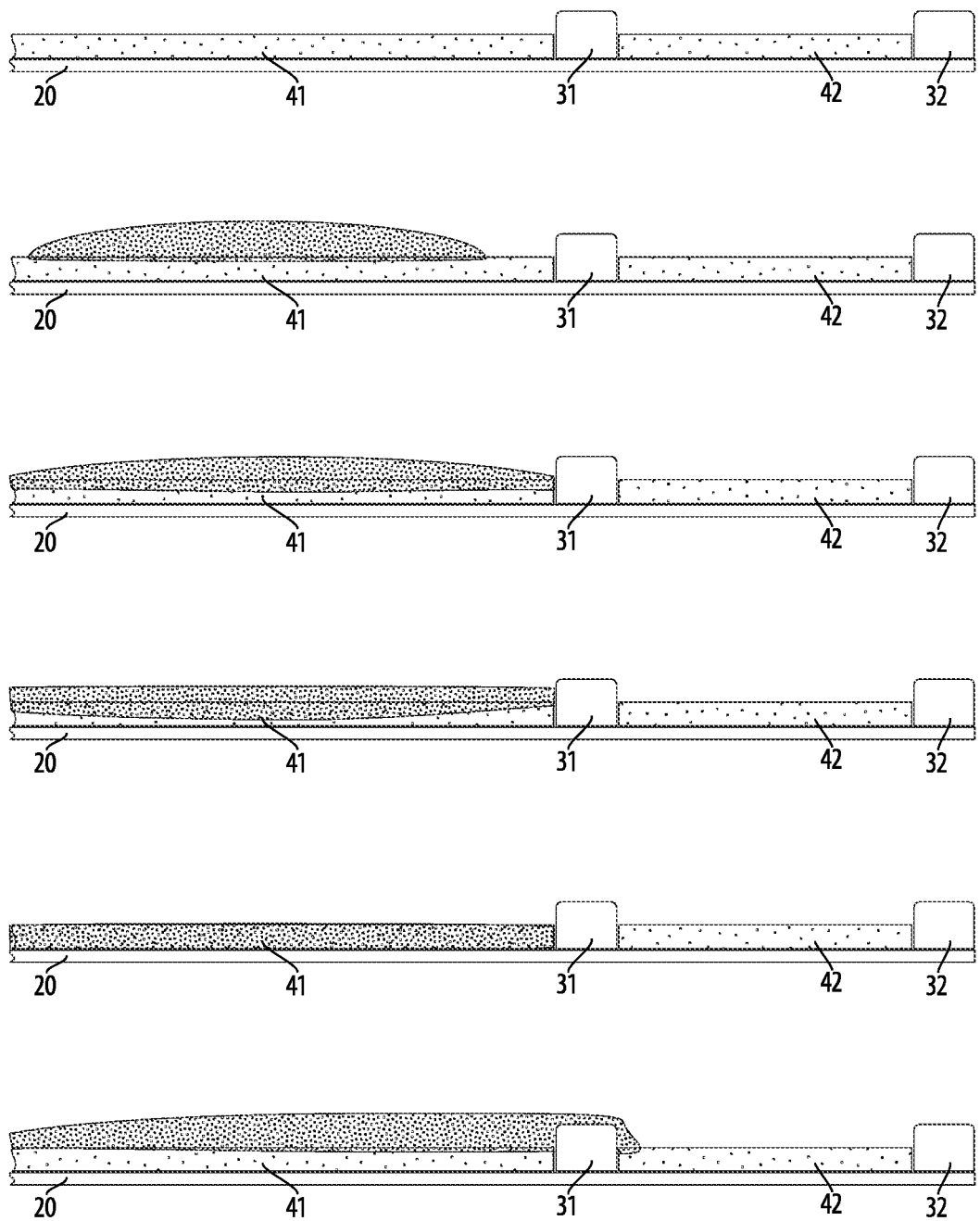
FIG. 3 is an illustration of the spill-preventive pet-training invention in use.

Referring to FIG. 3, in use, the invention provides a central portion where the impermeable base 20 supports an inner absorbent sheet 41 and an outer absorbent sheet 42, with an inner ridge 31 between and an outer ridge 32 at the outer perimeter. When liquid, such as urine, is applied to the central portion, the inner absorbent sheet 41 begins to absorb it, but if the volume and rate of application is greater than the capacity of the absorbent pad to absorb the liquid at its place of application and then wick the liquid to the unused areas of the pad, then the liquid will spread laterally, presenting a danger of spilling off the edge of the pad. Such lateral spread of the liquid is blocked by the inner ridge 31, which has a ridge height greater than that of the top of the inner absorbent sheet 41. Normally, the inner ridge 31 will block all of the spreading liquid, which will be fully absorbed by the inner absorbent sheet 41. If the level of spreading liquid exceeds the ridge height of the inner ridge 31, then the inner ridge may be overtopped. Even in such an event, the inner ridge still blocks a portion of the spreading liquid, and the lateral velocity of the overtopping portion of the liquid is slowed by a vertical change of direction in pouring over the outer side of the inner ridge and other physical aspects of the overtopping. An outer absorbent sheet 42 is provided to absorb any such overtopping liquid, and an outer ridge 32 at the outside perimeter is provided to perform the same blocking action as performed by the inner ridge 31.

Another embodiment of the invention provides a single ridge 31. Normally, a single ridge 31 will block all of the spreading liquid, which will be fully absorbed by the inner absorbent sheet 41.

An embodiment of the invention provides a fully disposable spill-preventive pet-training apparatus where the concentric flexible raised ridges 30 are integral to, and molded, embossed, or deposited into or onto the impermeable base 20, made of a flexible impermeable material such as a plastic film, with an inner absorbent sheet 41 and an outer absorbent sheet 42 glued or otherwise attached to the impermeable base 20. A variant of this embodiment provides a more durable and re-useable integrated impermeable base 20 and concentric flexible raised ridges 30, and disposable and replaceable absorbent sheets.

Another embodiment of the invention provides a durable and re-useable concentric flexible raised ridges 30 assembly held in proper relation one to another by ridge spacers 35. This assembly could be made of, for instance, silicone rubber that can be safely washed with hot water or steam. A durable and re-useable impermeable base 20 is also provided. In use, a disposable unitary absorbent sheet 43 is placed upon the impermeable base 20, and the concentric flexible raised ridges 30 assembly is placed upon the absorbent sheet. Optionally, the base and the ridges assembly can be provided with means of magnetically fastening to one another by embedded magnets or magnetic metal in each piece.

Yet another embodiment provides a durable and re-useable concentric flexible raised edges 30 assembly, as above, but provides a disposable impermeable base 20, optionally integrated with an absorbent sheet. Such assemblies of disposable impermeable plastic-backed absorbent sheets, such as pads used in healthcare facilities, are available.

Many changes and modifications can be made in the present invention without departing from the spirit thereof. I therefore pray that my rights to the present invention be limited only by the scope of the appended claims.

I claim:

1. A spill-preventive pet-training apparatus for use in containing the lateral flow of a volume of liquid during the time required for the liquid to be absorbed, the spill-preventive pet-training apparatus comprising:
   (i) an impermeable base, defining a horizontal coverage area and having a center portion and a perimeter portion;
   (ii) more than one concentric flexible raised ridges arrayed upon the perimeter portion of said impermeable base, such that said concentric flexible raised ridges extend upward from said impermeable base to a ridge height, and such that an inner ridge and an outer ridge are defined; and
   (iii) an absorbent layer arrayed upon said impermeable base, such that the highest portion of said absorbent layer at the center portion of said impermeable base is lower than the ridge height of said inner ridge;
   where said inner ridge blocks the lateral flow of liquid applied to said absorbent layer before such liquid is completely absorbed, up to the ridge height of said inner ridge, where any portion of the lateral flow of liquid exceeding the ridge height of said inner ridge is slowed and subsequently contained by said outer ridge and absorbed by said absorbent layer.

2. The spill-preventive pet-training apparatus of claim 1, where said absorbent layer further comprises a unitary absorbent sheet.

3. The spill-preventive pet-training apparatus of claim 1, where said absorbent layer is provided with a single, raised ridge.

4. The spill-preventive pet-training apparatus of claim 1, where said absorbent layer further comprises an inner absorbent sheet and an outer absorbent sheet.

5. The spill-preventive pet-training apparatus of claim 1, further comprising two concentric flexible raised ridges.

6. The spill-preventive pet-training apparatus of claim 1, further comprising at least one ridge spacer connecting the inner ridge and the outer ridge of said concentric flexible raised ridges.

7. The spill-preventive pet-training apparatus of claim 1, where said impermeable base and said concentric flexible raised ridges are provided as a combined unit.

8. The spill-preventive pet-training apparatus of claim 1, where said impermeable base, said concentric flexible raised ridges, and said absorbent layer are provided as a combined unit.

9. The spill-preventive pet-training apparatus of claim 1, where said impermeable base, said concentric flexible raised ridges, and said absorbent layer are made to be disposable.

10. The spill-preventive pet-training apparatus of claim 1, where said impermeable base and said concentric flexible raised ridges are made to be durable and re-useable, and said absorbent layer is made to be disposable.

11. The spill-preventive pet-training apparatus of claim 1, where said impermeable base and said absorbent layer are made to be disposable, and said concentric flexible raised ridges are made to be durable and re-useable.

12. The spill-preventive pet-training apparatus of claim 1, where said impermeable base and said concentric flexible raised ridges are made from plastic materials.

13. A spill-preventive pet-training method, comprising:
    (i) providing a spill-preventive pet-training apparatus comprising:
        (a) an impermeable base, defining the horizontal coverage area and having a center portion and a perimeter portion;
        (b) more than one concentric flexible raised ridges arrayed upon the perimeter portion of said impermeable base such that said concentric flexible raised ridges extend upward from said impermeable base to a ridge height, and such that an inner ridge and an outer ridge are defined; and
        (c) an absorbent layer arrayed upon said impermeable base such that the highest portion of said absorbent layer at the center portion of said impermeable base is lower than the ridge height of said inner ridge;
        where said inner ridge blocks the lateral flow of liquid applied to said absorbent layer before such liquid is completely absorbed, up to the ridge height of said inner ridge, where any portion of the lateral flow of liquid exceeding the ridge height of said inner ridge is slowed and subsequently contained by said outer ridge and absorbed by said absorbent layer; and
    (ii) using said spill-preventive pet-training apparatus for containing the lateral flow of a volume of liquid such as urine during the time required for the liquid to be absorbed.

14. The spill-preventive pet-training method of claim 13, where said spill-preventive pet-training apparatus further comprises two concentric flexible raised ridges.

15. The spill-preventive pet-training method of claim 13, where said spill-preventive pet-training apparatus further comprises one flexible raised ridge.

16. The spill-preventive pet-training method of claim 13, where said spill-preventive pet-training apparatus further comprises at least one ridge spacer connecting the inner ridge and the outer ridge of said concentric flexible raised ridges.

17. The spill-preventive pet-training method of claim 13, where said absorbent layer further comprises a unitary absorbent sheet.

18. The spill-preventive pet-training method of claim 13, where said absorbent layer further comprises an inner absorbent sheet and an outer absorbent sheet.

19. The spill-preventive pet-training method of claim 13, where said impermeable base and said concentric flexible raised ridges are provided as a combined unit.

20. The spill-preventive pet-training method of claim 13, where said impermeable base, said concentric flexible raised ridges, and said absorbent layer are provided as a combined unit.

21. The spill-preventive pet-training method of claim 13, where said impermeable base, said concentric flexible raised ridges, and said absorbent layer are made to be disposable.

22. The spill-preventive pet-training method of claim 13, where said impermeable base and said concentric flexible raised ridges are made to be durable and re-useable, and said absorbent layer is made to be disposable.

23. The spill-preventive pet-training method of claim 13, where said impermeable base and said absorbent layer are made to be disposable, and said concentric flexible raised ridges are made to be durable and re-useable.

24. The spill-preventive pet-training method of claim 13, where said impermeable base and said concentric flexible raised ridges are made from plastic materials.

* * * * *